United States Patent [19]

Imagawa et al.

[11] Patent Number: 5,293,744
[45] Date of Patent: Mar. 15, 1994

[54] EXHAUST MANIFOLD MUFFLER FOR AN INTERNAL COMBUSTION ENGINE

[75] Inventors: Toshiyuki Imagawa; Hirohide Sakuma; Eihi Nawata, all of Toyota, Japan

[73] Assignees: Toyota Jidosha Kabushiki Kaisha; Aisin Takaoka Kabushiki Kaisha, both of Aichi, Japan

[21] Appl. No.: 919,429

[22] Filed: Jul. 23, 1992

[30] Foreign Application Priority Data

Jul. 26, 1991 [JP] Japan ................... 3-208736

[51] Int. Cl.$^5$ ............... F01N 3/28; F01N 7/10
[52] U.S. Cl. ...................... 60/302; 60/323; 181/238; 181/240
[58] Field of Search .............. 60/302, 282, 323; 181/238, 240, 274, 279, 280

[56] References Cited

U.S. PATENT DOCUMENTS

| | | | |
|---|---|---|---|
| 2,911,066 | 11/1959 | Neely | 60/323 |
| 3,927,525 | 12/1975 | Jacobs | 60/301 |
| 4,091,616 | 5/1978 | Loweg | 60/299 |

FOREIGN PATENT DOCUMENTS

| | | |
|---|---|---|
| 3-105011 | 5/0191 | Japan . |
| 55135118 | 3/1979 | Japan . |
| 60-43111 | 3/1985 | Japan . |
| 57813 | 3/1991 | Japan ........................... 60/323 |

*Primary Examiner*—Douglas Hart
*Attorney, Agent, or Firm*—Kenyon & Kenyon

[57] ABSTRACT

An exhaust manifold muffler having an exhaust manifold portion 10 and a muffler portion 20 integral with the exhaust manifold portion 10. The exhaust manifold portion 10 includes a plurality of manifold pipes 11 having parallel downstream ends which are spaced from each other and are arranged in a row. Each manifold pipe is connected to a respective cylinder of an internal combustion engine such that exhaust pressure pulsations from the manifold pipes operate as reflected waves opposite in phase, so as to damp the pressure pulsations. The muffler portion 20 has a first muffler chamber 22 and a swirl pipe 29 installed in the first muffler chamber 22. The manifold pipes 11 extend tangentially into the first manifold chamber to produce a swirl in the first muffler chamber 22. Part of the swirl enters an upper inlet end of the swirl pipe. The swirl pipe 29 has a lower outlet end which is located between the downstream ends of the manifold pipes 11. When the recirculated exhaust gas flows out of the swirl pipe 29, it aspirates the exhaust gas from the manifold pipes 11. As a result, the flow resistance of the muffler is small.

13 Claims, 3 Drawing Sheets

EXHAUST MANIFOLD MUFFLER FOR AN INTERNAL COMBUSTION ENGINE

BACKGROUND OF THE INVENTION

1. Field of the Invention

The present invention relates to a muffler of the type that integrally combines an exhaust manifold and a muffler (hereinafter, an exhaust manifold muffler) for an internal combustion engine.

2. Description of the Prior Art

Various types of exhaust manifold mufflers are proposed in, for example, Japanese Utility Model Publications SHO 60-43111 and SHO 56-85011 and Japanese Patent Publication 3-105011. More particularly, Publication SHO 60-43111 discloses a resonance type muffler structure integral with a catalytic converter installed below exhaust ports of an engine. Publication SHO 56-85011 discloses a muffler having an exhaust gas inlet connected to a first end of a perforated pipe, a first expansion chamber to which a second end of the perforated pipe opens, a second expansion chamber connected to the exhaust inlet via the perforated pipe, and an exhaust gas outlet connected to the second expansion chamber. Publication HEI 3-105011 discloses a muffler having a catalyst installed therein.

However, there are problems with the conventional exhaust manifold mufflers, such as increased exhaust gas flow resistance and amplified pressure pulsations between exhaust manifold pipes. For example, with the muffler of Publication SHO 60-43111, since the muffler is of a resonance type, the flow resistance is large. With the muffler of Publication SHO 56-85011, since the exhaust gas flows into the first expansion chamber, then reverses flow from the first expansion chamber to the perforated pipe and finally flows to the second expansion chamber, turbulences are generated within the perforated pipe that increase the flow resistance and hence the exhaust back pressure of the engine is increased. With the muffler of Publication HEI 3-105011, when the exhaust gas flows to the catalyst, the back pressure of the engine will be increased.

SUMMARY OF THE INVENTION

An object of the invention is to provide an exhaust manifold muffler which can decrease the flow resistance and also can decrease the amplitudes of pressure pulsations in the manifold pipes to effectively reduce exhaust noise.

The above-described object is achieved by an exhaust gas manifold muffler for an internal combustion engine in accordance with the present invention. The exhaust manifold muffler includes an exhaust manifold portion and a muffler portion integral with the exhaust manifold portion. The exhaust manifold portion includes a plurality of manifold pipes having upstream ends and downstream ends. Each of the upstream ends of the manifold pipes is connected to a respective cylinder of the internal combustion engine. The downstream ends of the manifold pipes are spaced from each other and are arranged in parallel with each other and in a row. The muffler portion includes a first muffler chamber enlarged in cross section and a swirl pipe installed in the first muffler chamber. Each of the downstream ends of the manifold pipes extends tangentially into the first muffler chamber so as to produce a swirl of exhaust gas in the first muffler chamber. The swirl pipe includes an inlet end portion positioned to receive a portion of the swirl of exhaust gas from the manifold pipes and an outlet end. The outlet end of the swirl pipe is located between and faces in the same direction as the downstream end portions of the manifold pipes.

Since the cross-sectional area of the swirl pipe is smaller than the cross-sectional area of each manifold pipe, the velocity of the portion of the swirl of exhaust gas flowing from the manifold pipes into the swirl pipe increases while flowing in the swirl pipe and creates a low pressure region at the downstream ends of the manifold pipes when the portion of the exhaust gas flows out of the swirl pipe. As a result, the exhaust gas can flow through the manifold pipes smoothly, and the flow resistance in the exhaust manifold muffler and the exhaust back pressure of the engine are decreased. Further, since the downstream ends of the manifold pipes are parallel and spaced from each other, and since they open into the first muffler chamber of enlarged cross section, pressure pulsations from each manifold pipe operate as reflected waves to respective manifold pipes to weaken the pulsatory pressure waves in the manifold pipes and to effectively damp exhaust noise.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENT

Figure 1:
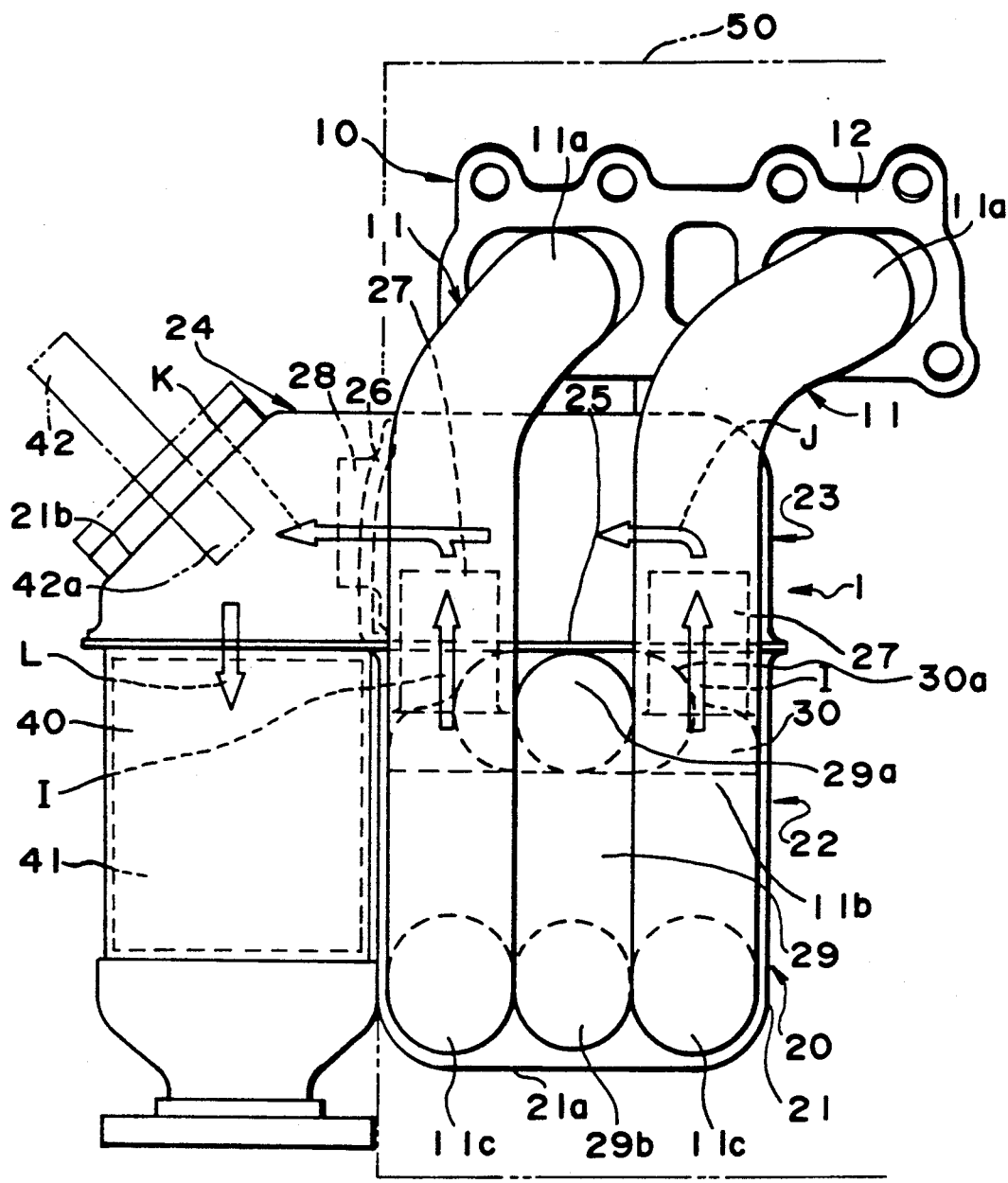
FIG. 1 is a front elevational view of an exhaust manifold muffler in accordance with one embodiment of the present invention.
Figure 2:
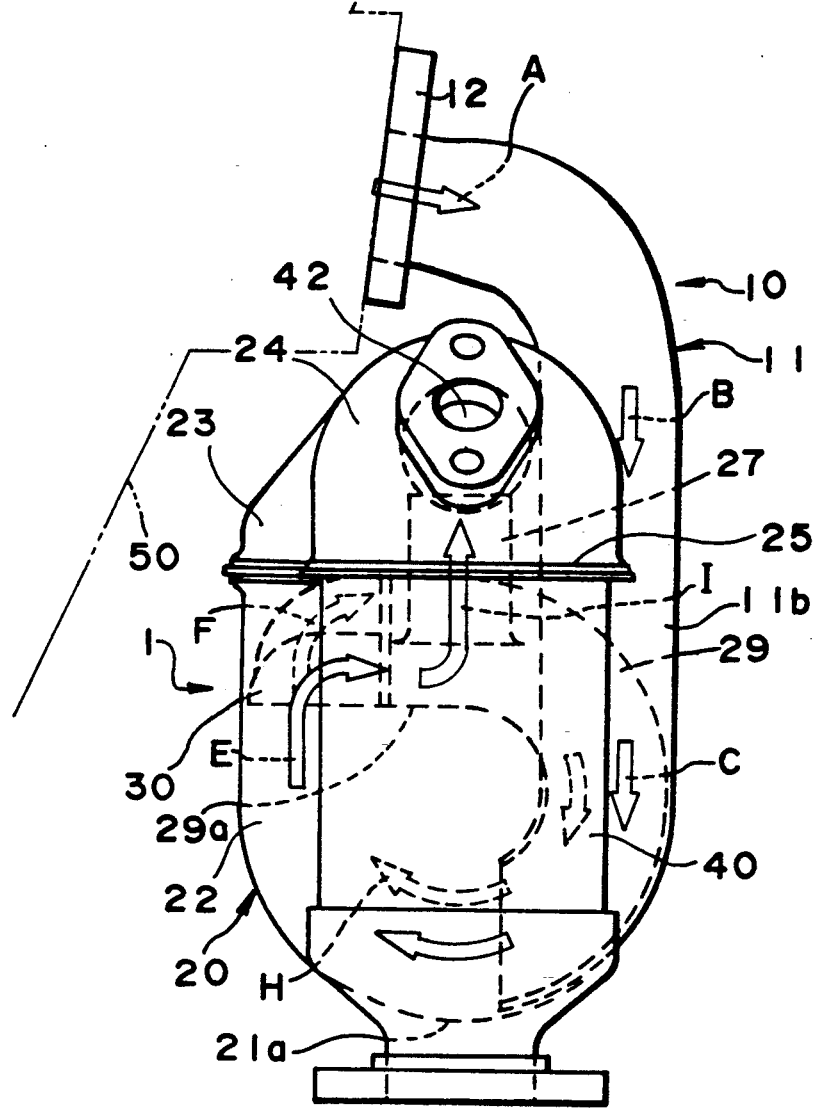
FIG. 2 is a side elevational view of the exhaust manifold muffler of FIG. 1.
Figure 3:
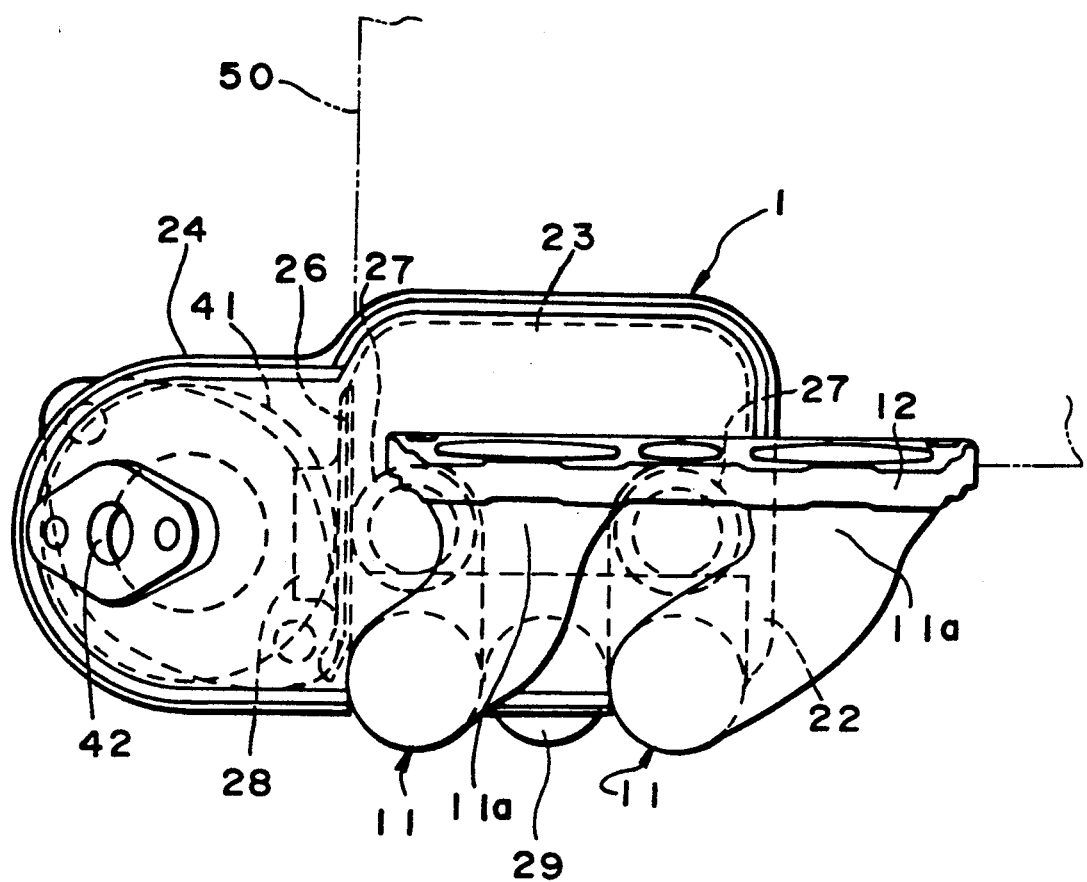
FIG. 3 is a plan view of the exhaust manifold muffler of FIG. 1.

As illustrated in FIGS. 1-3, an exhaust manifold muffler 1 in accordance with one embodiment of the present invention includes an exhaust manifold portion 10 and a muffler portion 20 connected to a downstream side of the exhaust manifold portion 10. The exhaust manifold muffler may include a catalytic converter portion 40 connected to a downstream end of the muffler portion 20. These portions 10, 20, and 40 are integral with each other to form a single assembly which is coupled to a multi-cylinder internal combustion engine 50. Due to this single assembly, the structure of the exhaust manifold muffler 1 is simplified, compact, and light.

The exhaust manifold portion 10 includes a plurality of manifold pipes 11 connected to cylinders of the multi-cylinder internal combustion engine 50 and a flange 12 for coupling the manifold pipes 11 to an engine cylinder head.

The plurality of manifold pipes 11 are spaced from each other. Each manifold pipe 11 includes an upstream end 11a, an intermediate portion 11b, and a downstream end 11c. Each upstream end 11a of the manifold pipe 11 is connected to a respective cylinder of the multi-cylinder internal combustion engine 50. The downstream ends of the manifold pipes 11 are arranged in parallel with each other and in a row. The intermediate portions 11b extend in a vertical direction. The upstream end 11a and the downstream end 11c of each manifold pipe 11 are bent to extend laterally toward the internal combustion engine 50 as shown in FIG. 2.

The muffler portion 20 includes a first muffler chamber 22 enlarged in cross section compared with the manifold pipes 11 and with a swirl pipe 29 installed in the first muffler chamber 22. The downstream ends 11c of the manifold pipes 11 open into the first muffler chamber 22. Since the downstream ends 11c of the manifold pipes 11 are parallel and spaced from each other, exhaust pressure pulsations from the manifold pipes 11 are reflected as pressure waves opposite in phase so as to decrease the amplitude of pressure pulses in respective manifold pipes. As a result, exhaust noise is effectively suppressed. The sound suppressing effect of the first muffler chamber 22 and the manifold pipes 11 is about three times that of the conventional vehicle muffler. The swirl pipe 29 includes an inlet end 29a and an outlet end 29b. The outlet end 29b of the swirl pipe 29 is located between the spaced downstream ends 11c of the manifold pipes 11.

The muffler portion 20 includes a muffler housing 21, with a first partition 25 and a second partition 26 for sectioning the interior of the muffler housing 21 into the first muffler chamber 22, a second muffler chamber 23, and a third muffler chamber 24. A plurality of first inner nozzeles 27 extend through the first partition so as to connect the first muffler chamber 22 to the second muffler chamber 23; a second inner nozzle 28 mounted in the second partition 26 connects the second muffler chamber 23 to the third muffler chamber 24, and a swirl guide 30 is installed in the first muffler chamber 22 adjacent to the inlet end of the swirl pipe.

The second muffler chamber 23 is located above the first muffler chamber 22, and the third muffler chamber 24 is located on a side of the second muffler chamber 23. The catalytic converter portion 40 is located below the third muffler chamber 24 and on a side of the first muffler chamber 22. Due to this arrangement, the catalytic converter portion 40 can be heated quickly after engine start-up by receiving heat from the first muffler chamber 22.

The downstream ends 11c of the manifold pipes 11 extend tangentially into a lower portion of the first muffler chamber 22 so as to produce a swirl in the first manifold chamber 22 when the exhaust gas flows from the manifold pipes 11 into the first muffler chamber 22.

The muffler housing 21 includes a lower portion 21a which also defines a bottom wall of the first muffler chamber 22. The cross section of lower portion 21a of the muffler container 21 is semicircular to help generation of a swirl in the first muffler chamber 22. Due to the swirl producing and guiding structures, collision of flow is suppressed and the flow resistance of the exhaust manifold muffler is effectively decreased.

The swirl pipe 29 extends in a semicircle from an upper portion of the first muffler chamber 22 to the lower portion of the first muffler chamber 22. The inlet end of the swirl pipe 29 faces into the direction of the swirl generated in the first muffler chamber 22 by the manifold pipes 11. The outlet end of the swirl pipe 29 opens in the swirl direction in parallel with and in the row of the downstream ends of the manifold pipes 11. The swirl pipe 29 has a circular cross section and a cross-sectional area equal to or smaller than a cross-sectional area of each manifold pipe 11. Therefore, when a portion of the exhaust gas flows into the swirl pipe 29, the speed of the portion of the exhaust gas is increased.

Due to this increased speed, the exhaust gas is aspirated from the manifold pipes 11 by the recycled portion of the exhaust gas that flows out of the swirl pipe 29. As a result, the flow resistance of the manifold pipes 11 is effectively reduced and the exhaust back pressure of the engine is decreased.

The swirl guide 30 located in the upper portion of the first muffler chamber 22 is configured to guide part of the swirl flow produced in the first muffler chamber 22 toward the inlet end of the swirl pipe 29. More particularly, the swirl guide 30 has a quarter circle cross section in a plane perpendicular to the row direction of the manifold pipes 11, as shown in FIG. 2, so as to funnel part of the swirl smoothly into the swirl pipe 29. The swirl guide 30 is configured with a centrally raised mid-portion 30a, as shown in FIG. 1, so that the swirl from the spaced apart manifoled pipes 11 is guided toward the mid-portion 30a of the swirl guide 30 and thence into the inlet end of the swirl pipe 29. The inlet end of the swirl pipe 29 opens in a horizontal direction in the mid-portion of the swirl guide 30. Due to these structures, a portion of the exhaust gas smoothly enters the swirl pipe 29.

The number of first inner nozzles 27 is equal to the number of manifold pipes 11. An axis of each first inner nozzle 27 and an axis of a respective manifold pipe are located in the same plane perpendicular to the row direction of the manifold pipes 11. Each first inner nozzle 27 has a circular cross section and has a cross-sectional area smaller than a cross-sectional area of the respective manifold pipe 11. As a result, when the exhaust gas flows through the first inner nozzle 27, the exhaust gas is throttled at the first inner nozzle 27 and then is expanded in the second muffler chamber 23. Due to this throttle and expansion, a sound suppressing effect and a pulsatory pressure wave damping effect are obtained again. Further, exhaust gases from respective cylinders are mixed with each other.

The second inner nozzle 28 which connects the second muffler chamber 23 to the third muffler chamber 24 extends horizontally. The second inner nozzle 28 again throttles the exhaust gas flow and then expands it to further weaken the pulsatory pressure waves and damp the exhaust noise. The muffler housing 21 has a second portion 21b facing the outlet of the second inner nozzle 28 at a 45° angle to an axial direction of the second inner nozzle 28. The throttled exhaust gas is thus directed by second inner nozzle 28 to collide with the second portion 21b of the muffler housing 21 and then is reflected by the second portion 21b of the muffler housing 21 toward the catalytic converter portion 40.

An oxygen sensor 42 is installed at the second portion 21b of the muffler housing 21 so that a sensing portion 42a of the oxygen sensor 42 is directly exposed to the exhaust gas flowing from the second inner nozzle 28 toward the second portion 21b of the muffler housing 21. Due to the direct collision of the exhaust gas with the oxygen sensor, the sensing characteristic and the response of the air-fuel ratio control are improved.

A catalyst 41 is housed in the catalytic converter portion 40. The catalyst 41 is preferably a three-way monolithic catalyst. The catalyst 41 is required to be quickly heated after engine start-up, but the maximum temperature should not be high from the viewpoint of durability. Since the catalyst is located adjacent to the muffler portion 20, the catalyst can be quickly heated during warming-up of the engine. Due to heat release through the side surface of the converter case opposite the first muffler chamber 22, however, the maximum temperature of the catalyst is maintained relatively low. The exhaust gas flows substantially evenly through many narrow passages formed in the monolithic catalyst 41. Since the catalyst 41 is located downstream of the muffler portion 20, sound transmission to the environment through the monolithic catalyst 41 is effectively cut.

Operation of the above-described exhaust manifold muffler will now be explained.

As shown by the solid-line arrows A, B, C, and D in FIG. 2, exhaust gas from a plurality of indivisual cylinders of the internal combustion engine 50 flows through the respective manifold pipes 11 of the manifold portion 10 tangentially into the first muffler chamber 22 of the muffler portion 20. The semicircular cross section of the lower portion 21a of the muffler housing 21 causes the exhaust gas to swirl around the inside of the housing up to the swirl guide 30 (sollid-line arrow E). The swirl guide deflects part of the exhaust gas (dashed-line arrow F) into the raised mid-portion 30a, which funnels the diverted part to flow through the swirl pipe 29 (dashed-line arrows G and H) to recirculate to the lower portion of the muffler housing. The remainder of the exhaust gas then flows through the first inner nozzles 27 into the second muffler chamber 23 (solid-line arrows I in FIGS. 1 and 2), then flows through the second inner nozzle 28 into the third muffler chamber 24 (solid-line arrows J and K in FIG. 1), then flows from the third muffler chamber 24 to the monolithic catalyst 41 of the catalytic converter portion 40 (solid-line arrow L in FIG. 1), and flows finally to the exhaust pipe. Sound is damped especially when the exhaust gas flows through the muffler portion 20.

The exhaust gas can smoothly flow through the first muffler chamber 22, because a swirl is produced by the tangential entry of the downstream ends 11c of the manifold pipes 11 into the first muffler chamber 22, the swirl is reinforced by the recirculation of part of the exhaust gas from the swirl pipe 29. Since all of the gas circulates in the same direction, little collision will occur in the swirl flow formed in the first muffler chamber 22. As a result, the flow resistance of the exhaust manifold muffler is greatly reduced, and the exhaust back pressure of the engine is also decreased. Therefore, the engine output is improved.

Recirculation through the swirl pipe 29 also helps to thoroughly mix the exhaust gases from the respective cylinders of the engine, and the mixed gas is directed toward and collides with the oxygen sensor 42. As a result, oxygen concentration is detected exactly and evenly. Therefore, the response characteristic of the air-fuel ratio control and the purification characteristic of exhaust gas are greatly improved.

After passing through the muffler portion 20, the exhaust gas flows through the catalyst 41. Since the catalytic converter portion 40 is located downstream of the muffler portion 20, any engine exhaust noise remaining at the exit of the muffler portion 20 is cut further by the catalyst 41 and is prevented from being transmitted to a downstream portion of the catalytic converter portion 40. The converter portion 40 thus has not only an exhaust gas purification function but also an engine exhaust noise reducing function.

In accordance with the present invention, since manifold pipes 11 extends tangentially into the first muffler chamber 22 and the swirl pipe 29 is located between the manifold pipes 11, the exhaust gas can flow smoothly so that the flow resistance of the exhaust manifold muffler and the exhaust back pressure of the engine are decreased. Further, since the manifold pipes 11 are spaced from each other and are arranged in parallel with each other, pulsatory pressure waves and sounds in the manifold pipes are effectively damped.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. An exhaust manifold muffler for a multi-cylinder internal combustion engine comprising:

an exhaust manifold portion including a plurality of manifold pipes, each having an upstream end, an intermediate portion and a downstream end, wherein each of the upstream ends of the manifold pipes is connected to a respective cylinder of the internal combustion engine and each of the downstream ends is spaced from the other downstream ends and wherein the manifold pipes are arranged in parallel with each other and in a row; and a muffler portion including a muffler housing defining a first muffler chamber, each of the downstream ends of the manifold pipes extending tangentially into the first muffler chamber so as to produce a swirl of exhaust gases in the first muffler chamber, a swirl pipe arranged in the first manifold chamber and extending in a semicircle from an upper portion of the first muffler chamber and a lower portion of the first muffler chamber, the swirl pipe having an inlet end that faces the swirl direction of the exhaust gases and an outlet end which is located between and faces the same direction as the downstream ends of the manifold pipes, and wherein the first muffler chamber is enlarged in cross-section compared with the manifold pipes.

2. An exhaust manifold muffler according to claim 1, wherein the exhaust manifold portion includes a flange mounted on the upstream ends of the manifold pipes and fastened to the internal combustion engine, the upstream end and the downstream end of each manifold pipe being bent toward the internal combustion engine.

3. An exhaust manifold muffler according to claim 2, wherein the muffler portion includes:

a first partition and a second partition for dividing the interior of the muffler housing into the first muffler chamber, a second muffler chamber, and a third muffler chamber;

a plurality of first inner nozzles penetrating the first partition so as to communicate the first muffler chamber with the second muffler chamber;

a second inner nozzle penetrating the second partition so as to communicate the second muffler chamber with the third muffler chamber; and a swirl guide installed in the first muffler chamber to direct part of the exhaust gases from the downstream ends of the manifold pipes toward the inlet end of the swirl pipe.

4. An exhaust manifold muffler according to claim 3, wherein the muffler housing includes a lower portion that serves as a bottom wall of the first muffler chamber, the lower portion of the muffler housing having a semicircular cross section.

5. An exhaust manifold muffler according to claim 3, wherein the swirl guide is located in an upper portion of the first muffler chamber, the swirl guide being configured with a centrally raised mid-portion in the row direction of the manifold pipes and having a quarter-circle cross section in a plane perpendicular to the row direction of the manifold pipes.

6. An exhaust manifold muffler according to claim 3, wherein the number of the first inner nozzles equals the number of manifold pipes, each first inner nozzle having an axis located in a plane in which an axis of each manifold pipe is located.

7. An exhaust manifold muffler according to claim 3, wherein each first inner nozzle has a cross-sectional area equal to or smaller than a cross-sectional area of each manifold pipe.

8. An exhaust manifold muffler according to claim 3, wherein the second inner nozzle has a cross-sectional area equal to or smaller than the total cross-sectional areas of the first inner nozzles.

9. An exhaust manifold muffler according to claim 3, wherein the muffler housing includes a portion facing the second inner nozzle in an axial direction of the second inner nozzle, the portion of the muffler housing inclining by 45° with respect to the axial direction of the second inner pipe.

10. An exhaust manifold muffler according to claim 1, wherein the swirl pipe has a cross-sectional area smaller than a cross-sectional area of each manifold pipe.

11. An exhaust manifold muffler according to claim 1, further comprising a catalytic converter portion connected to the muffler portion, the exhaust manifold portion, the muffler portion, and the catalytic converter portion being assembled into a single integral assembly.

12. An exhaust manifold muffler according to claim 11, wherein the catalytic converter portion is arranged in heat exchanging relation on a side of the first manifold chamber.

13. An exhaust manifold muffler according to claim 11, wherein the catalytic converter portion includes a monolithic three-way catalyst.

* * * * *

UNITED STATES PATENT AND TRADEMARK OFFICE
CERTIFICATE OF CORRECTION

PATENT NO. : 5,293,744
DATED : March 15, 1994
INVENTOR(S) : Toshiyuki Imagawa, et al It is certified that error appears in the above-indentified patent and that said Letters Patent is hereby corrected as shown below:

On the Title Page, Item [75], please correct the following inventor's name from "Eihi NAWATA" to --Eiji NAWATA--.

Signed and Sealed this

Third Day of January, 1995

Attest:

BRUCE LEHMAN

Attesting Officer

Commissioner of Patents and Trademarks